Aug. 22, 1933.  M. CASTRICUM  1,923,296

METHOD OF AND MACHINE FOR TESTING MATERIALS

Filed June 8, 1929

INVENTOR.
Martin Castricum.
BY
ATTORNEY.

Patented Aug. 22, 1933

1,923,296

UNITED STATES PATENT OFFICE 1,923,296

METHOD OF AND MACHINE FOR TESTING MATERIALS

Martin Castricum, Springfield, Mass., assignor to The Fisk Rubber Company, Chicopee Falls, Mass., a Corporation of Massachusetts; John B. Pierce and Charles A. Dana, Receivers Application June 8, 1929. Serial No. 369,296

10 Claims. (Cl. 265—2)

My invention relates to material testing machines and more specifically to a device for determining the repeated stress fatigue in elastic materials.

It has for its object the provision of a device which will alternately stress and relieve the material to be tested and a further object is to provide means for ascertaining the point at which the material undergoes a permanent change in length and the amount of such change. Other and further objects will be apparent from the following specification and claims.

In the accompanying drawing which illustrates one embodiment of my invention,

Figure 1:
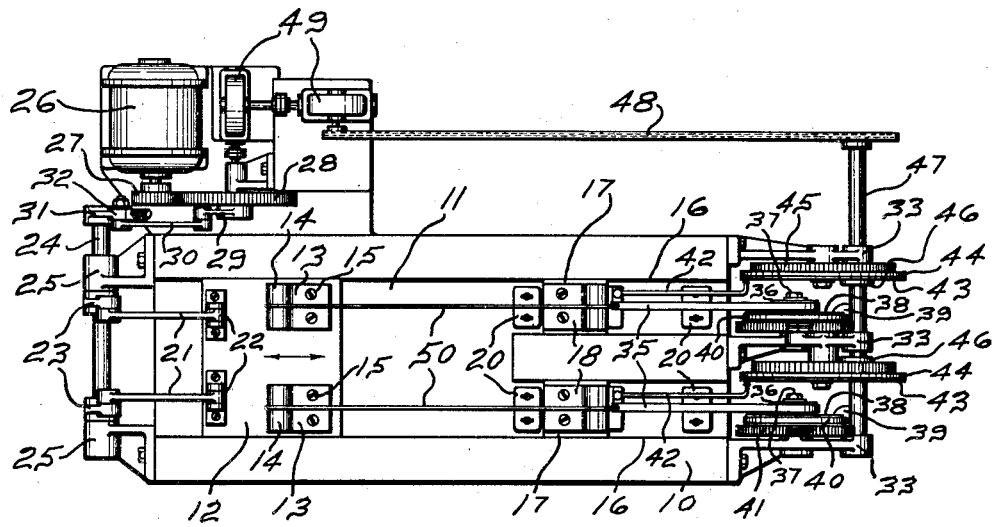
Fig. 1 is a plan view of the device.

In the drawing I have shown a device for simultaneously but independently testing a plurality of cords such as are used in pneumatic tire casings but it will be understood that rubber or other materials may be the subject of test. It will be further understood that my invention may equally well be embodied in a device for testing one or any reasonable number of samples.

Referring to the drawing 10 indicates a supporting table or frame having a guideway 11 formed on its surface in which is reciprocably mounted a slide 12 which supports a plurality (two in the device illustrated) of cord clamping blocks 13. The clamps used may be of any suitable form, the form shown comprising blocks 13 provided with rounded edges 14 about which the cord is bent and held between the slide 12 and the block, the latter being drawn down on the slide by screws 15. At the end of the table 10 opposite the slide 12 the guideway 11 is divided to form individual guideways 16 for slides 17, each carrying a cord clamp 18 similar in structure to clamp 13 but reversed. The slides 17 operate between adjustable stops 20 and 20' secured in the guideways 16. The slide 12 is adapted to be reciprocated in the guideway 11 by means of links 21 pivoted at one end to the slide as at 22 and at the other to arms 23 secured to a rock shaft 24 mounted in bearings 25 secured to the end of the table. Rock shaft 24 is driven from a motor 26, the shaft of which carries a gear 27 meshing with a gear 28 provided with a crank 29 connected by a pitman 30 to an arm 31 secured to shaft 24. The pitman 30 is adjustably connected to arm 31 as at 32 to permit adjustment of the travel of slide 12.

The slides 17 are connected by steel bands 35 to drums 36 secured to stud shafts 37 journaled in brackets 33 secured to table 10. Drums 38 of larger diameter than drums 36 are also secured to the stud shafts 37 and weights 39 are secured by bands 40 to the drums 38, the weights 39 thus tending to draw slides 17 away from slide 12. The weights 39 might be connected directly to drums 36 but by the arrangement shown smaller weights may be used. The stud shafts 37 also carry fine toothed ratchet wheels 41 which, with multiple pawls 41', permit movement of the slides 17 away from slide 12 under the action of the weights 39 but prevent movement of slides 17 in the opposite direction. The slides 17 are each provided with an adjustable stylus 42 engaging record sheets 43 which are secured to disks 44 mounted on gears 45 driven by gears 46 secured to a shaft 47 which is driven from motor 26 by a chain drive 48 through speed reducing units 49 and gear 28.

Figure 2:
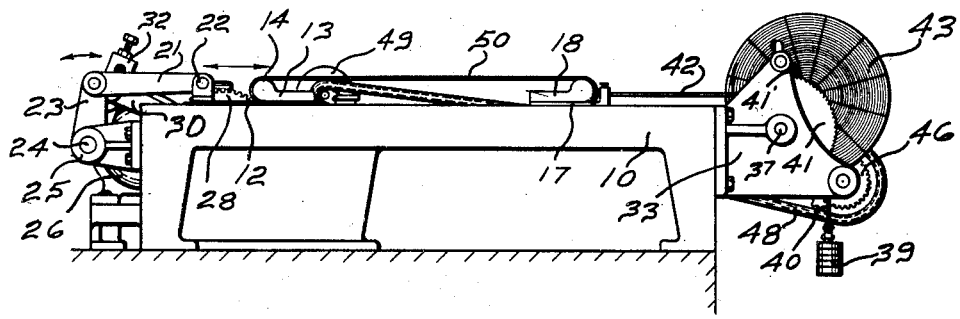
Fig. 2 is a front elevation of the structure as shown in Fig. 1.

In operation lengths of cord 50 are clamped between the opposed clamps 13 and 18 so that the cords are taut but unstressed, except for weights 39, when the slide 12 is at the inner end of its throw and slides 17 are adjacent the stops 20. The motor 26 is then started, which reciprocates slide 12 through a distance determined by the setting of adjustment 32, and slowly rotates the record sheet 43. As the slide 12 is drawn forward the cords are stretched, slides 17 being held against forward movement by pawls 41'. As the slide moves toward slides 17 again the cords, if they are sufficiently elastic, completely recover from the stretch and as long as this condition exists the stylus 42 traces an arc of a circle on the record sheet. Under repeated stress and relief, however, the cords become fatigued and retain a permanent elongation. When this occurs weights 39 draw the slides 17 away from slide 12 as the slide 12 moves inward towards slides 17 and pawls 41 hold the latter slides in their new position which is recorded by the stylus on the record sheet by the movement of the stylus toward the center of the record sheet as indicated in Fig. 2. Thus successive increments of permanent elongation are recorded. The speed at which the record sheet is rotated in relation to the divisions marked on the sheet may obviously be made such as to show the various elements of time and work which measure the resistance of the cord to fatigue and the extent of the fatigue.

Figure 3:
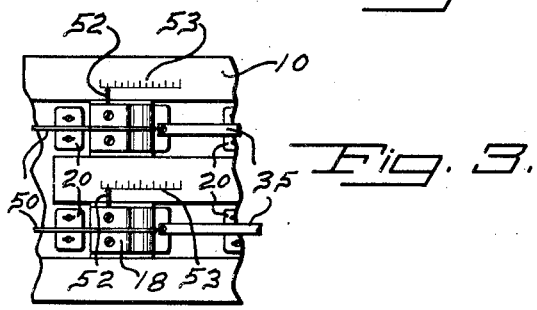
Fig. 3 is a detail showing a modification.

In Fig. 3 I have shown a modification in which the slides 17 are provided with pointers 52 which, as the pawls and ratchet permit the slides 17 to retreat, move over scales 53. Thus the movement can be timed and the increments of permanent elongation measured. The automatic recording previously described is, of course, preferred.

Having just described my invention, I claim:

1. A device for testing materials which comprises, means for periodically subjecting a piece of the material to a stress sufficient to linearly distort the piece a predetermined, fixed, measured amount, and means to maintain the successive linear distortions of the piece constant irrespective of resulting permanent linear distortion due to the fatigue of the material.

2. A device for testing materials which comprises, means for periodically subjecting a piece of the material to a stress sufficient to elongate the piece a predetermined, fixed, measured amount, means to maintain the successive elongations of the piece constant irrespective of resulting permanent elongation due to the fatigue of the material and means to indicate the progressive fatigue of the material.

3. A device for testing materials which comprises, means for periodically subjecting a piece of the material to a stress sufficient to linearly distort the piece a predetermined, fixed, measured amount, means to maintain the successive linear distortions of the piece constant irrespective of the degree of permanent linear distortion suffered by the material and means to record the increment of said permanent distortion and the relative time in the period of test at which it occurs.

4. A device for testing materials which comprises opposed members adapted to engage the ends of a length of material, means to periodically move one of said members toward and from the second member a predetermined distance to distort the length of material a predetermined amount, and means to prevent movement of the second member in the direction of the distorting stress imparted to the material by the movement of the first member but permitting the second member to move freely in the opposite direction.

5. A device for testing materials which comprises two opposed clamps adapted to receive the ends of a length of the material to be tested, means to periodically move one of said clamps toward and from the second clamp a predetermined distance and means preventing movement of the second clamp toward the first clamp but permitting it to move freely away from the first clamp.

6. A device for testing materials which comprises a support including a guideway, a material clamp reciprocably mounted in the guideway and means to periodically reciprocate said clamp through a predetermined distance, a second guideway, a second material clamp reciprocably mounted in said second guideway and substantially aligned with the first clamp, means urging the second clamp away from the first clamp and pawl and ratchet means to normally prevent movement of the second clamp towards the first clamp.

7. A device for testing materials which comprises two opposed clamps adapted to receive the ends of a length of the material to be tested, means to periodically move one of said clamps toward and from the second clamp a predetermined distance, means preventing movement of the second clamp toward the first clamp but permitting it to move freely away from the first clamp as the material between the clamps becomes permanently elongated and means including a stylus associated with the second clamp to record the movement of the latter away from the first clamp.

8. A device for testing materials which comprises a support including a guideway, a material clamp reciprocably mounted in the guideway and means to periodically reciprocate said clamp through a predetermined distance, a second guideway, a second material clamp reciprocably mounted in said second guideway and substantially aligned with the first clamp, means urging the second clamp away from the first clamp, pawl and ratchet means to normally prevent movement of the second clamp towards the first clamp, and means including a stylus secured to the second clamp to record the movement of the latter away from the first clamp.

9. The method of testing materials which comprises periodically stretching a length of material a predetermined amount from a predetermined normal condition and permitting it to return to said normal condition after each stretching operation, the distance the material is stretched from its normal to its stretched condition being kept constant regardless of any permanent increase in length acquired by the material during successive stretching operations.

10. The method of testing materials which comprises periodically linearly distorting a piece of material a predetermined, fixed, measured amount from a predetermined normal condition and permitting it to return to said normal condition after each distorting operation, the amount the material is distorted from its normal to its distorted condition being kept constant regardless of any permanent distortion acquired by the material during successive distorting operations.

MARTIN CASTRICUM.